United States Patent [19]

Bender et al.

[11] Patent Number: 5,030,283

[45] Date of Patent: Jul. 9, 1991

[54] PASTELIKE PIGMENT FORMULATIONS AND PREPARATION AND USE THEREOF

[75] Inventors: Albert Bender, Mainz; Manfred Schneider, Eppstein/Taunus; Rainer Schunck, Kelkheim, all of Fed. Rep. of Germany

[73] Assignee: Hoechst Aktiengesellschaft, Frankfurt am Main, Fed. Rep. of Germany

[21] Appl. No.: 381,585

[22] Filed: Jun. 22, 1989

[30] Foreign Application Priority Data

Jun. 25, 1988 [DE] Fed. Rep. of Germany ....... 3821507

[51] Int. Cl.$^5$ ............... C08K 5/09; C08K 5/10; C08K 5/00; C09D 11/06; C09D 11/08; C09D 11/10; C09D 11/00

[52] U.S. Cl. .................... 106/228; 106/22; 106/23; 106/408; 106/493; 106/32; 106/311; 106/499; 106/504

[58] Field of Search .............. 106/22, 23, 408, 493, 106/32, 504, 311, 499

[56] References Cited

U.S. PATENT DOCUMENTS

| | | | |
|---|---|---|---|
| 3,635,745 | 1/1972 | Rentel et al. | 106/288 Q |
| 3,880,788 | 4/1975 | Rudolphy | 260/25 |
| 3,950,288 | 4/1976 | Herbst et al. | 260/22 |
| 4,197,378 | 4/1980 | Rudolphy et al. | 525/134 |
| 4,234,466 | 11/1980 | Takahashi et al. | 260/17 A |
| 4,506,059 | 3/1985 | Hultzsch et al. | 525/134 |
| 4,533,723 | 8/1985 | Weitemeyer | 528/303 |
| 4,773,937 | 9/1988 | Schneider et al. | 106/493 A |

FOREIGN PATENT DOCUMENTS 0255667 2/1988 European Pat. Off. .
3626907 2/1988 Fed. Rep. of Germany .

OTHER PUBLICATIONS

Payne, H. F., "Organic Coating Technology", vol. I, 1954, pp. 156 & 283, copied att'cd.
H. D. Zettler, Chem. Abs. 109:24287u (1988).

*Primary Examiner*—William R. Dixon, Jr.
*Assistant Examiner*—Scott L. Hertzog

[57] ABSTRACT

The invention relates to readily storable flushed pastes of pigments of the arylparaosanilinesulfonic acid series, consisting essentially of (a) up to 50% by weight of the pigment, in a binder combination of (b) natural resin esters based on unmodified or modified natural resins with monohydric or polyhydric $C_1$–$C_{20}$-alcohols, and (c) long-oily alkyd resins having an oil content of 60% to 90% by weight dissolved in high-boiling mineral oil. These formulations are prepared from aqueous presscakes of pigment (a) by flushing in the presence of the solution of a mixture of at least one natural resin ester (b) and at least one alkyd resin (c) in mineral oil (d) with elimination of water. The novel pigment formulations are used for producing printing inks for letterpress and offset printing.

10 Claims, No Drawings

PASTELIKE PIGMENT FORMULATIONS AND PREPARATION AND USE THEREOF

Pastelike pigment formulations and preparation and use thereof

The present invention relates to novel, useful arylpararosanilinesulfonic acid pigment formulations which are suitable for producing printing inks, in particular letterpress and offset printing inks.

It is common knowledge to subject aqueous presscakes of pigments from the series of the arylpararosanilinesulfonic acids of the formula I

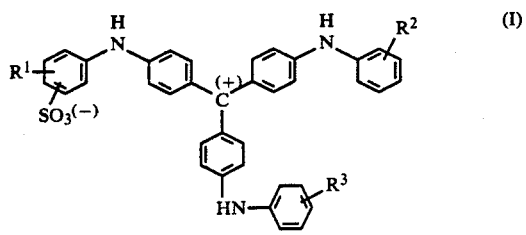

where $R^1$, $R^2$ and $R^3$ are each independently of the others hydrogen, halogen, such as chlorine or bromine, $C_1$-$C_3$-alkyl, $C_1$-$C_3$-alkoxy or nitro, to flushing, which transfers the pigment into a binder with substantial dehydration and concentration (see K. Winnacker, L. Küchler "Chemische Technologie", 3rd edition, volume 4, pages 362, 375, 376 and 408 (1972)). This gives flushed concentrates which contain the pigment in a finely divided form and which are easily incorporable into a letterpress or offset printing varnish to produce strong letterpress and offset ink colors.

The use of flushed concentrates in place of pigment powders in the production of printing inks is a particular advantage in the case of arylpararosanilinesulfonic acid pigments. This is because if the aqueous pigment presscakes are dried, as is customary with many other pigments, the arylpararosanilinesulfonic acid pigments mentioned form, on account of their pronounced polarity, hard agglomerates which, as is found on milling on a three-roll stand, are no longer divisible by normal mechanical stress. The poor dispersibility of these pigments has an unfavorable effect on the color strength, homogeneity, gloss and transparency of the printing inks produced therefrom. The dried, unformulated arylpararosanilinesulfonic acid pigments are therefore unusable for use in printing inks. The flushed pigments or pigment pastes do not have this disadvantage if the right binder is chosen.

The binders predominantly used for flushing arylpararosanilinesulfonic acid pigments consist of a resin mixture and a high-boiling mineral oil. Such binders are described in DE Patent 2,354,225 (U.S. Pat. No. 3,950,288). They are resin mixtures in mineral oil, wherein the mineral oil content is 35–60% by weight. The resin mixtures are so constituted that thorough wetting of the pigment is ensured during the kneading in the flushing process. However, the wetting -properties of this resin mixture must not be so pronounced as to lead to a significant emulsification of the previously eliminated water, which would seriously impair the flushing process.

Furthermore, the flushing agents must not contain any water-soluble or -miscible constituents to any significant degree, since they would likewise interfere with, or perhaps prevent, the flushing process.

The flushing resin disclosed in DE Patent 2,354,225, which consists of a long-oil alkyd resin and a hydrocarbon resin, makes for highly effective flushing, in particular if aromatics-containing mineral oil is used. However, the degree of flushing itself may then be fairly incomplete at times, so that the removal of the last traces of water under reduced pressure can take a very long time. Moreover, the quality of the hydrocarbon resins to be processed must meet high requirements. The starting hydrocarbons are not always available, and it is not always possible to comply exactly with all the specific parameters if starting materials from different sources are used. Consequently, different results may come about in respect of the effectiveness of the flushing and the compatibilities and brightening characteristics of the ready-produced printing inks.

In addition, the ecologically motivated ever increasing use of aromatics-free or low-aromatics mineral oils in printing ink formulations demands resin combinations which are precisely attuned in respect to the solubility of the flushing resins in the mineral oil and the compatibility of the resins with the binders in printing inks. More particularly, low-aromatics mineral oils show poor solvency in respect to the hydrocarbon resin described in DE Patent 2,354,225. Keeping this resin in solution then requires relatively high proportions of alkyd resin which also serves as a solubilizer. However, this increases the proportion of drying oils in the flushed paste, which becomes noticeable in the readyproduced printing ink causing extended drying times. This is a disadvantage in high-speed printing presses.

It is an object of the present invention to provide flushed pastes of arylpararosanilinesulfonic acid pigments where the flushing binder is a resin or resin mixture without hydrocarbon resin content and where the abovementioned disadvantages are absent.

A very wide range of flushing binders are known from the prior art. German Patent 1,769,912 mentions inter alia binders based on natural resin esters. EP-A-0,255,667 disclosed flushing processes using alkyd resins. However, neither the natural resin esters nor the alkyd resins of the prior art have a flushing effect on the pigments of the abovementioned formula (I); neither type of binder brings about the removal of water.

The invention provides pigment formulations consisting essentially of
a) pigments of the general formula (I) mentioned,
b) natural resin esters based on unmodified or modified natural resins and monohydric or polyhydric alcohols of 1 to 20 carbon atoms,
c) long-oil alkyd resins having an oil content of 60 to 90% by weight and
d) mineral oil.

Of particular interest are pigment formulations according to the invention which contain
a) up to 50% by weight of pigments,
b) natural resin esters based on unmodified dispropor-tionated or hydrogenated rosin and 2 to 6-hydric alcohols of 1 to 10 carbon atoms,
c) long-oil alkyd resins having an oil content of 70 to 85% by weight and
d) mineral oil having a boiling range between 200° and 500° C., preferably between 240° and 450° C.,
the weight ratio of natural resin ester b) to alkyd resin c) being 1:0.25 to 1:2.5, preferably 1:0.35 to 1:2, and the weight ratio of the sum of resins b)+c) to mineral oil d) being 1:3 to 1:0.5, preferably 1:2.7 to 1:0.7.

A pigment formulation according to the invention may contain one or more of pigments, natural resin esters, alkyd resins or mineral oils.

The pigment formulations according to the invention may also contain other, customary additives or assistants, for example preservatives such as fungicides or flushing aids.

Suitable natural resin esters are esters of natural resin acids, for example esters of abietic acid, dehydroabietic acid, dihydroabietic acid, tetrahydroabietic acid, levopimaric acid, dextropimaric acid, isodextropimaric acid, neoabietic acid, palustric acid, pimaric acid and isopimaric acid, of the type present in commercial rosins. Preference is given to esters of rosin, such as esters of balsam rosin, root resin and tall resin, and also esters of disproportionated or hydrogenated rosin. However, it is also possible to use other rosin derivatives, such as esters of polymerized and dimerized rosin and of rosin adducts with unsaturated mono- or dicarboxylic acids, for example maleic anhydride adducts.

Suitable alcohols for esterifying the natural resin acids are mono-, di- or polyalcohols of 1 to 20 carbon atoms and the mixtures thereof, for example lower aliphatic alcohols, such as methanol, ethanol, propanol, butanol, isobutanol, pentanol, hexanol and heptanol, fatty alcohols of 8 to 20 carbon atoms, dialcohols, such as ethylene glycole, propylene glycol, butylene glycol, diethylene glycol, triethylene glycol ethers and neopantylglycol ethers, and polyalcohols such as glycerol, trimethylolpropane, pentaerythritol, dipentaerythritol, pentitols and hexitols.

Preferred pigment formulations contain natural resin esters based on 2- to 6-hydric alcohols, in particular alcohols from the group consisting of glycerol, trimethylolpropane and pentaerythritol.

Preferred alkyd resins are the coalkyd resins described in German Patent 2,354,225. However, it is also possible to use those which contain only drying or semi-drying or non-drying oils, for example commercial linseed alkyd resins such as ®Alftalat AL 810 (81% oil content) or ®Alftalat AL 766 (76% oil content). In general, the long-oil alkyd resins of component c) can be prepared in a conventional manner as oil- or fatty-acid-modified polyesters, in which case it is preferable to react isophthalic and orthophthalic acid and small amounts of an α,β-unsaturated dicarboxylic acid, or a plurality thereof, with a mixture of glycerol and pentaerythritol and oils or fatty acids or combinations thereof, in stages or in a single stage.

Suitable oils for preparing the long-oil alkyd resins are for example linseed oil, castor oil, coconut oil, rapeseed oil, ricinenic oil, sunflower oil, cottonseed oil, soybean oil, groundnut oil, tall oil and tallow oil, preferably linseed oil or castor oil, and combinations thereof. If fatty acids are used for preparing the long-, oil alkyd resins, suitable fatty acids and fatty acid mixtures are for example those which are obtainable by hydrolyzing the aforementioned oils. It is also possible to use straight-chain or branched saturated fatty acids of 7–10 carbon atoms, fatty acids from the hydrolysis of fats, in particular bovine tallow fat, resin acids, benzoic acid, p-tert-butylbenzoic acid and combinations thereof.

Both the alkyd resins prepared using the above-mentioned oils and the alkyd resins prepared using the above-mentioned fatty acids are specified in terms of an "oil content". This so-called oil content is defined as the weight proportion, based on the alkyd resin, of modifying oils or fatty acids, expressed as triglycerides, which are used in the -preparation of the alkyd resin.

It is advisable to use esters having an acid number below 30 and the alkyd resins having an acid number below 20. Preference is given to esters having an acid number below 20 and to alkyd resins having an acid number below 10. Higher acid numbers are in general less advantageous, since corresponding compounds are partly watersoluble and have an emulsifying effect; this normally slows down the flushing process which then does not go to completion. For this reason, preference is also given to those flushing resin solutions of natural resin esters, alkyd resin and mineral oil whose acid number is less than 30, preferably less than 20, in particular less than 10.

The natural resin esters and alkyd resins are prepared in a conventional manner. Corresponding processes are described for example in W. Sandermann, "Naturharze, Terpentinöl, Tallöl", Springer-Verlag Berlin/Göttingen/Heidelberg 1960 or in D. H. Solomon "The Chemistry of Organic Film Formers", John Wiley & Sons, Inc., New York 1967.

The mineral oil used can be aromatics-containing, low-aromatics or aromatics-free. Preference is given to using low-aromatics or aromatics-free mineral oil.

The pigment formulations according to the invention preferably contain 40 to 45% by weight of pigment and have a viscosity within the range from 30 to 70 Pascal.-sec (Pa.s), measured with a falling rod viscometer. Flushed paste viscosities within the range from 30 to 70 Pa.s have largely proved themselves in practical use; since they ensure good handling of flushed paste and the resulting pastes are standardized to make it possible to produce offset printing inks which meet the application requirements in rheology, tack, water compatibility and printability. Moreover, the flushing resin solution to used according to the invention is viscosity standardizable with mineral oil within wide limits, preferably within the viscosity range of 300 to 3000 mPa.s, preferably 400 to 1500 mPa.s, in particular 500 to 1000 mPa.s, without adversely affecting the excellent flushing characteristics. This is of substantial importance for example for industrial handling.

The present invention further provides a process for preparing the pigment formulations according to the invention consisting essentially the abovementioned components a) to d) by flushing the aqueous presscakes of the pigments of the abovementioned general formula (I). This involves flushing the aqueous presscakes of pigments a) in the presence of a resin mixture of at least one natural resin*b) and at least one alkyd resin c) in mineral oil d). * ester The general procedure adopted is to flush the water-moist presscakes in a conventional manner by means of double trough kneaders of conventional design in stages with a solution of the resins mentioned at b) and c) in mineral oil d) and separating off the eliminated water. Flushing takes care of removing the bulk of the water present in the aqueous pigment presscakes. The last traces of water can be removed in a conventional manner under reduced pressure.

Besides constituents a) to d) it is possible to add and incorporate further, customary additives or assistants before, during or after flushing.

Extensive attempts at flushing by using the individual resins b) or c) were not successful; no flushed paste was obtainable with any of them. It was all the more surprising to observe that by mixing the two resins b) and c) in mineral oil it is possible to prepare an effective flushing binder. The pigment formulations according to the invention have viscosities so low that the pigment content can, if desired, be increased up to 50% by weight while meeting the practical viscosity requirement of 30 to 100 Pa.s. The standardized viscosity of the flushed pastes according to the invention changes little upon storage at 60° C. over 3 days. In customary mixtures with a wide range of black printing inks, the flushed pastes show excellent brightening characteristics on printing by the offset process.

The present invention also provides the use of the pigment formulations according to the invention for producing printing inks. The pigment formulations according to the invention are notable for excellent properties which appear to make them suitable in particular for producing letterpress and offset printing inks. For instance, the pigment formulations have in general a tack between 8 and 20, preferably 10 and 16, incometer units, measured on an "Inkomat" tackometer from Prüfbau (Munich), as is required for pigment products used in letterpress and offset printing inks. Tack is measured here in terms of the torque transferred by a roll which is covered with the formulation to an undriven, adjacent roll on account of the tack of the formulation (an incometer unit corresponds to 60 cm . pond and is specific to the instrument).

The pigment formulations according to the invention have good storage properties. Even on prolonged storage at 50° to 60° C. the pigment formulations show stable viscosity characteristics within the practically interesting range of from 30 to 100 Pa.s.

Furthermore, the pigment formulations show only a small increase in thixotropy. To detect any increase in thixotropy, the thixotropy is first determined on a freshly prepared formulation and then on a sample stored at 60° C. in a heated cabinet for three days. Thixotropy is taken here to be measured by the force which needs to applied in order to move a sphere 6 mm in diameter within the pigment formulation at a dip speed of 15 mm/min. Under the above-described storage conditions, the thixotropy of the pigment formulations according to the invention increases only to the degree which is customary for flushed pastes based on hard resins.

The pigment formulations according to the invention are notable for very wide compatibility with the binder and printing ink systems customary for the various printing processes, such as letterpress and lithography, in single-color or multi-color printing. They are for example easily incorporable in binder systems for letterpress inks, offset inks, heat-set offset inks or web-fed newsprint inks. The printing inks pigmented with the formulations according to the invention are satisfactorily printable and produce strong bright prints. The pigment formulations according to the invention are also suitable for mixing with black pastes to produce printing inks which, on printing, produce an excellent brightening effect. The pigment formulations are also suitable for producing printing inks for copy papers and ink ribbons.

In the Examples below, parts and percentages are by weight, unless otherwise stated. In the Examples, the structure of the pigments used is in some cases shown as an "idealized formula". In these cases, the pigment used contains a mixture of triarylpararosanilinemonosulfonic acids, which are formed together in the course of the sulfonation of the corresponding triarylpararosaniline and which differ from each other in the position of the sulfo group on one of the structurally different terminal aryl radicals.

EXAMPLE 1

240 parts of a pigment based on triphenylpararosanilinemonosulfonic acid of the idealized formula II

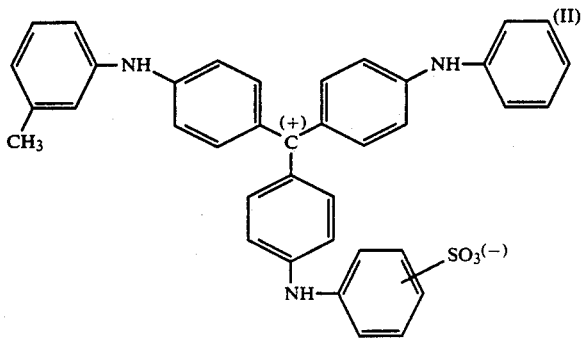

are flushed as aqueous presscake (936 parts) having a pigment content of 25.6%, in a kneader having sigmoid kneader paddles, with 195 parts of an approximately 55% strength flushing resin solution prepared from 3 parts of rosin pentaerythritol ester, 3 parts of mixed alkyd resin 2 from DE Patent 2,354,225 having an oil content of about 78%, and 5 parts of a mineral oil having a boiling range from 240° to 440° C. The acid number of the flushing resin solution is 7 and its viscosity is 900 mPa.s.

First 547 parts of the moist presscake are kneaded with 146 parts of the 55% strength flushing resin solution, and after about 20 minutes 295 parts of water are separated off by tipping the kneader. After the addition of 230 parts of moist presscake and the slow dropwise addition of 25 parts of the flushing resin solution, the second flushing operation releases 150 parts of water. After the water has been separated off, the remaining 159 parts of the presscake are added, followed by the dropwise addition of 24 parts of flushing resin solution, and a third flushing operation is carried out. In total, this method removes 88% (corresponding to 619 parts) of the water introduced with the presscake. Furthermore, during the drying under reduced pressure, mineral oil of the boiling range 240° to 440° C., or a corresponding amount of the flushing resin solution, is added at the rate required to maintain a kneadable consistency. The result is a blue pastelike pigment formulation having a viscosity of 48 Pa.s and a pigment content of 42.8%. The pigment formulation gives a tack of 13.4 to 13.6 incometer units and hence is highly suitable for use in printing inks for letterpress and offset printing, where it produces highly brightened prints.

In the course of three days, storage at 60° C., the thixotropy of the pigment formulation only increased to the extent which is customary with flushed pastes based on hard resin varnishes, i.e. not to a viscosity above 200 mPa.s.

The pigment formulation can be mixed with other printing inks by simple incorporation with a dissolver or on a three-roll stand. For instance, mixing one part of the pigment formulation according to the invention with four parts of a black paste composed of 20% carbon black, 75% varnish and 5% wax paste (30% polyethylene wax in mineral oil) in the presence of 1% of varnish drier gives a printing ink which on printing shows high gloss and brightening.

EXAMPLE 2

240 parts of a triphenylpararosanilinesulfonic acid pigment of the formula III

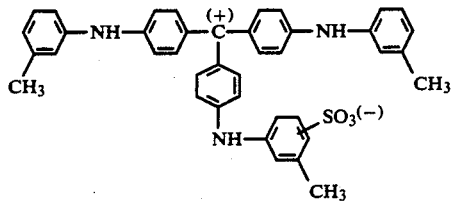

are flushed as an aqueous presscake (879 parts) having a pigment content of 27.3% as described in Example 1. 91% of water introduced with the presscake is released and is decanted off. Before the kneading batch is dried under reduced pressure, a further 20 parts of the approximately 55% strength flushing resin are added. Drying is complete after 4 hours. After the paste has been standardized with flushing resin viscosity of 39 Pa. it has a pigment content of 44.3% and shows a tack of 12.3 to 13.7. It is highly suitable for use in printing inks for letterpress and offset printing. Gloss and brightening characteristics are very good.

COMPARATIVE EXAMPLE A

A kneader having sigmoid kneader paddles is charged with 120 parts of a pigment of the idealized formula II (see Example 1) in the form of an aqueous presscake (469 parts) having a pigment content of 25.6%. The contents are kneaded until homogeneous. Rosin pentaerythritol ester (acid number 12) in an approximately 65% strength solution in a mineral oil having a boiling range from 240° to 440° C. is added a little at a time in order to bring about flushing. However, even 5 hours, kneading at an increasing binder content up to a pigment:flushing resin solution ratio in the kneader of 1:2.0 does not release any water.

COMPARATIVE EXAMPLE B

Comparative Example is repeated, except that the pigment used is a pigment of the idealized formula III (see Example 2). After about one hours, kneading at a pigment:flushing resin solution of 1:1.3 water is released in an amount of 28 parts (about 8%). A subsequent 2nd and 3rd flushing operation does not bring about any further release of water.

COMPARATIVE EXAMPLE C

Comparative Example A is repeated, except that the flushing binder used is alkyd resin 1 from DE Patent 2,354,225 in the form of an approximately 70% strength solution in a mineral oil of boiling range from 260° to 290° C. Even 5 hours' kneading does not separate off any water.

COMPARATIVE EXAMPLE D

Comparative Example C is repeated, except that the flushing binder used is alkyd resin 2 from DE Patent 2,354,225. This resin likewise does not bring about any significant release of water during kneading.

This run is repeated using the pigment of the formula III (see Example 2). The result is again negative.

COMPARATIVE EXAMPLE E

Example 1 is repeated, except that the flushing resin solution used is binder E from DE Patent 2,354,225. After kneading for 35 minutes, there is a release of water. after 3 flushing operations the amount of water released is about 73%. Owing to the remaining high water content of the flushed paste, drying the flushed paste under reduced pressure as described in Example 1 takes about 2 hours longer than in Example 1.

EXAMPLE 3

80 parts of pigment of the idealized formula II (see Example 1) in the form of a water-moist presscake having a pigment content of 25.6% (312.5 parts) and 160 parts of the pigment of the idealized formula III (see Example 2), in the form of a water-moist presscake having a pigment content of 28.1% (569 parts), are mixed and flushed a little at a time as described in Example 1. The flushing binder used is a mixture of 3.4 parts of tall resin pentaerythritol ester, 1.0 part of mixed alkyd resin 2 of DE Patent 2,354,225 having an oil content of 81.5%, and 4.5 parts of a mineral oil having a boiling range from 240° to 440° C. The flushing resin solution has an acid number of 7 and a viscosity of 590 mPa.s. The three flushing operations proceed extremely smoothly, a total of 94% of the water present being released. The water remaining in the kneading paste is drawn off under reduced pressure in the course of about 2 hours. A total of 270 parts of the abovementioned flushing resin solution are added to give a 47% strength paste of high color strength and a viscosity of 93 Pa.s. Its tack is 12.4 to 12.8 incometer units. Mixing with a carbon black printing ink as described in Example 1 gives a printing ink having good gloss and brightening characteristics

EXAMPLE 4

240 parts of a pigment of the idealized formula IV

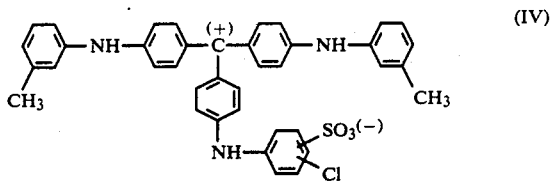

in the form of 988 parts of a water-moist presscake having a pigment content of 24.3% are flushed in three operations as described in Example 1. The flushing binder used is a mixture of 4 parts of tall resin pentaerythritol ester, 1.5 parts of mixed alkyd resin 2 from DE Patent 2,354,225 having an oil content of 78.5%, and 3.8 parts of a mineral oil having a boiling range from 260° to 290° C. The binder has an acid number of 8 and a viscosity of 2300 mPa.s. The flushing operations are quick. 91% of the introduced water is separated off. After the residual moisture content has been dried away under reduced pressure and 245 parts of the abovementioned flushing resin solution have been added at the same time together with an addition of 105 parts of the abovementioned mineral oil, the result is a flushing paste having a pigment content of 41%, a viscosity of 98 Pa.s and a tack of 14.2 to 14.7 incometer units. Mixing with a carbon black printing ink as described in Example 1 gives a printing ink having excellent gloss and brightening characteristics.

EXAMPLES 5 to 9

Example 1 is repeated with a pigment of the idealized formula II (see Example 1) and with the flushing resin solution components indicated in Table 1 under the conditions indicated in the table to prepare flushed pastes:

TABLE 1

| Ex. | Flush resin solution composed of | Acid Number | Viscosity [mPa · s] | Flushing time [h] | Water released [%] | Drying time [h] | Pigment content of paste [%] | Viscosity of paste [Pa · s] | Tack of paste |
| --- | --- | --- | --- | --- | --- | --- | --- | --- | --- |
| 5 | Rosin trimethylolpropane ester mixed alkyd (oil content about 78%) mineral oil boiling range 260–290° C. (mixing ratio 2:4:5) | 9 | 470 | 1.5 | 92 | 3 | 43.2 | 44 | 12.3–12.8 |
| 6 | Rosin neopentylglycol ester mixed alkyd (oil content about 84%) mineral oil boiling range 240–445° C. (mixing ratio 3:3:5) | 8 | 1050 | 1 | 89 | 3 | 43.0 | 56 | 13.1–13.4 |
| 7 | Rosin glycerol ester mixed alkyd (oil content about 84%) mineral oil boiling range 240–445° C. (mixing ratio 4:2:5) | 7 | 960 | 1.5 | 86 | 4 | 42.8 | 75 | 11.8–12.1 |
| 8 | Rosin dipentaerythritol ester mixed alkyd (oil content about 84%) mineral oil boiling range 240–445° C. (mixing ratio 3:4:3) | 7 | 1000 | 1 | 92 | 3 | 42.8 | 87 | 12.4–12.6 |
| 9 | Rosin pentaerthritol ester mixed alkyd (oil content about 84%) mineral oil boiling range 240–445° C. (mixing ratio 4:2:6) | 7 | 1400 | 1 | 93 | 2.5–3 | 42.5 | 105 | 13.4–13.7 |

(mixed alkyd = alkyd resin 2 of DE Patent 2,354,225)

What is claimed is:

1. A flushed pigment formulation in paste form, free from hydrocarbon resins, consisting essentially of
   a) 25% to 50% by weight of at least one pigment of the general formula I

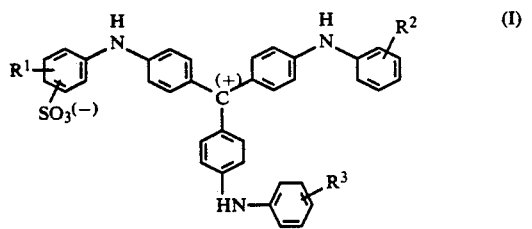

where $R^1$, $R^2$ and $R^3$ are each, independently of the others, hydrogen, chlorine, bromine, $C_1$–$C_3$-alkyl, $C_1$–$C_3$-alkoxy or nitro,
   b) at least one natural resin ester based on unmodified or modified natural resin acids and monohydric or polyhydric alcohols of 1 to 20 carbon atoms,
   c) at least one long-oil alkyd resin, based on a polyester, having an oil content of 50 to 90% by weight, whose oil content originates from the modification of the polyester with a drying, semidrying or non-drying oil or a mixture of at least two of these oils or corresponding fatty acids or combinations thereof, the dicarboxylic acid component of the polyester being a mixture of isophthalic acid and orthophthalic acid, a small proportion of one or more, α, β-unsaturated dicarboxylic acids or corresponding anhydrides or combinations thereof, and the polyhydric alcohol component being a mixture of glycerol and pentaerythritol, and
   d) a mineral oil having a boiling range between 200° C. and 500° C., the weight ratio of natural resin ester (b) to alkyd resin (c) being from 1:0.25 to 1:2.5 and the weight ratio of the sum of resins (b)+(c) to mineral oil (d) varying from 1:3 to 1:05.

2. The pigment formulation as claimed in claim 1, consisting of
   a) 40% to 45% by weight of pigment corresponding to formula I,
   b) natural resin ester based on unmodified, disproportionated or hydrogenated rosin and 2- to 6-hydric aliphatic alcohol of 1 to 10 carbon atoms,
   c) long-oil alkyd resin as defined in claim 1 having an oil content of 70 to 85% by weight, and
   d) mineral oil having a boiling range between 240° C. and 450° C.,
   wherein the weight ratio of natural resin ester b) to alkyl resin c) is from 1:0.35 to 1:2 and the weight ratio of the sum of resins b)+c): mineral oil d) being from 1:2.7 to 1:0.7.

3. The pigment formulations as claimed in claim 1, containing a natural resin ester b) based on natural resin from the group consisting of balsam rosin, root resin, tall resin and disproportionated or hydrogenated rosin and also alcohols from the group consisting of glycerol, trimethylolpropane and pentaerythritol.

4. The pigment formulation as claimed in claim 1, having a viscosity within the range from 30 to 70 Pa.s.

5. The pigment formulation as claimed in claim 1, wherein the natural resin esters b) have an acid number of below 30, and the alkyd resins c) have an acid number of below 20.

6. A process for preparing the flushed, pasty pigment formulation as claimed in claim 1, which consists essentially of the specified components a) to d), by flushing one or more pigments corresponding to formula I in the form of an aqueous presscake in a flushing resin solution which comprises kneading the moist presscake of the pigment or pigments a) in the presence of a solution of a resin mixture in mineral oil, the resin mixture comprising at least one natural resin ester of the type as defined as component b) and, calculated thereon, 0.25 to 2.5 times the amount of at least one long-oil alkyd resin of the type defined as component c), dissolved in mineral oil conforming to component d) and in an amount corresponding to 3 to 0.5 times the amount of the sum of resins (b)+(c), thereby incorporating the pigment into the flushing resin solution while removing the bulk of the eliminated water from the yielded pigment paste, and finally separating off the remaining water by treating the flushed paste of the pigment under reduced pressure.

7. The pigment formulation obtainable by the process as claimed in claim 6.

8. A method of using the flushed, pasty pigment formulation as claimed in claim 1, which comprises using the pigment formulation for pigmenting printing inks.

9. The method as claimed in claim 8, wherein the printing ink is a letterpress printing ink.

10. The method as claimed in claim 8, wherein the printing ink is offset printing ink.

* * * * *

UNITED STATES PATENT AND TRADEMARK OFFICE
CERTIFICATE OF CORRECTION

PATENT NO. : 5,030,283
DATED : July 9. 1991
INVENTOR(S) : Albert Bender, Manfred Schneider, Rainer Schunck It is certified that error appears in the above-identified patent and that said Letters Patent is hereby corrected as shown below:

In claim 1, (column 9, line 66), in item c) "50 to 90%" should read --60 to 90%--.

Column 10:
In claim 3, line 1, delete the "s" in "formulations".

Signed and Sealed this

Fourteenth Day of July, 1992

*Attest:*

DOUGLAS B. COMER

*Attesting Officer*  *Acting Commissioner of Patents and Trademarks*